United States Patent
Takahashi et al.

(10) Patent No.: US 6,193,304 B1
(45) Date of Patent: Feb. 27, 2001

(54) WINDSHIELD SUPPORTING STRUCTURE

(75) Inventors: Akio Takahashi; Kiyonari Shirato, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,263

(22) Filed: May 11, 1999

(30) Foreign Application Priority Data

May 12, 1998 (JP) ................................................ 10-129307

(51) Int. Cl.$^7$ ................................................ B62D 25/08
(52) U.S. Cl. ...................... 296/192; 296/96.21; 296/201; 296/189
(58) Field of Search ................................ 296/192, 194, 296/96.21, 201, 189

(56) References Cited

U.S. PATENT DOCUMENTS

| | | | |
|---|---|---|---|
| 4,718,712 | * | 1/1988 | Nakatani ................................ 296/192 |
| 4,718,713 | * | 1/1988 | Sakamoto et al. .................... 296/192 |
| 4,909,566 | * | 3/1990 | Hashimoto et al. .................. 296/192 |
| 4,938,526 | * | 7/1990 | Sannomiya et al. .................. 296/192 |
| 4,943,102 | * | 7/1990 | Hamamoto et al. ............. 296/192 X |
| 4,950,024 | * | 8/1990 | Watari et al. ......................... 296/192 |
| 4,976,491 | * | 12/1990 | Hashimoto et al. .................. 296/192 |

FOREIGN PATENT DOCUMENTS 6-16156    1/1994   (JP) .

OTHER PUBLICATIONS

U.S. application No. 09/359,387, filed Jul. 23, 1999, Akio Takahashi, Windshield Supporting Structure.

* cited by examiner

*Primary Examiner*—Joseph D. Pape
(74) *Attorney, Agent, or Firm*—Arent Fox Kintner Plotkin & Kahn, PLLC

(57) ABSTRACT

A windshield support is formed as a cantilever-like or overhang support including a bend portion 16, a box portion and a flange portion 20 which are formed continuously in that order. The bend portion 16 is extended from an instrument panel upper portion 12 and has a substantially V-shaped cross section. The box portion 18 has a hollow rectangular cross section and is sufficiently disposed away from the instrument panel upper portion 12. The flange portion 20 receives a front window glass 15. A recessed portion 12a is provided at the instrument panel upper portion 12 for receiving a lower portion 18a of the box portion 18 when the bend portion 16 has to be bent by virtue of an external force applied to the windshield.

3 Claims, 6 Drawing Sheets

WINDSHIELD SUPPORTING STRUCTURE

BACKGROUND OF THE INVENTION

1. Field of the Invention

The present invention relates to a windshield supporting structure in which impact is absorbed by deforming a part of a vehicle body.

2. Description of the Related Art

In a vehicle body structure, there is provided an impact absorbing structure in which an obstacle is protected against impact produced when the obstacle comes into collision with a vehicle body by absorbing the impact so produced by deforming a part of the vehicle body.

As a typical example of this impact absorbing structure, Japanese Patent Unexamined Publication No. Hei. 6-16156 proposes a "Windshield Mounting Structure". The technology disclosed in this Publication will be described below, referring to FIG. 6.

FIG. 6 is a sectional view of a related windshield supporting structure, in which figure a pre-deformation state is indicated by a solid line, while a post-deformation state is indicated by an imaginary line.

This windshield structure is constructed such that a second member 102 is mounted to a cowl top panel 100, that an inserting portion 102a of the second member 102 is inserted into a first member 104, that the first member 104 is attached to the cowl top panel 100 with clips 106 ), and that a windshield panel 110 is attached to a connecting surface 102b of the second member 102 with an adhesive 108.

An inclined portion 100a of the cowl top panel 100 is attached to an upper portion 112a of an instrument panel 112 so as to create a double construction. Therefore, should an obstacle such as a pedestrian come into collision with the windshield panel 110 to thereby produce an external force (force) F, which is applied to the windshield panel 110, the second member 102 is bent from a base portion 102c thereof, as shown by imaginary line.

However, since the distance L between a portion where the external force F is applied and the base portion 102c is short, even if the external force F is applied to the windshield panel 110, the second member 102 is only slightly deformed as indicated by the imaginary line. Due to this, should an obstacle come into collision with the windshield panel 110, there exists a risk of impact produced by the collision being not absorbed in a secure fashion.

SUMMARY OF THE INVENTION

Thus, an object of the present invention is to provide a technology for ensuring the absorption of impact applied to an obstacle.

A windshield support is formed as a cantilever-like or overhang support including a bend portion 16, a box portion and a flange portion 20 which are formed continuously in that order. The bend portion 16 is extended from an instrument panel upper portion 12 and has a substantially V-shaped cross section. The box portion 18 has a hollow rectangular cross section and is sufficiently disposed away from the instrument panel upper portion 12. The flange portion 20 receives a front window glass 15. A recessed portion 12a is provided at the instrument panel upper portion 12 for receiving a lower portion 18a of the box portion 18 when the bend portion 16 has to be bent by virtue of an external force applied to the windshield.

DETAILED DESCRIPTION OF THE PREFERRED EMBODIMENTS

Figure 1:
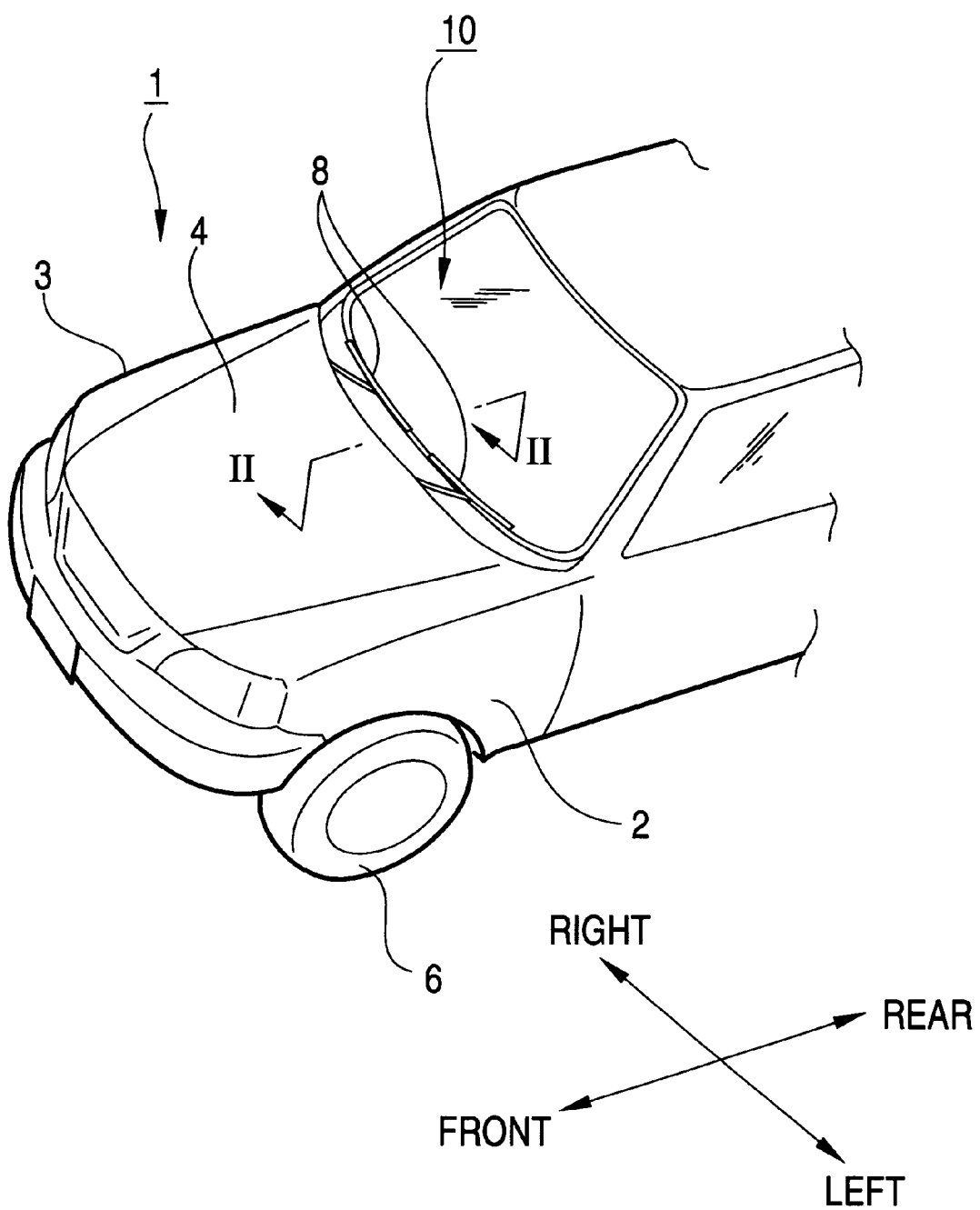
FIG. 1 is a perspective view showing a vehicle body to which a windshield supporting structure according to a first embodiment of the present invention is mounted.

Referring to the accompanying drawings, embodiments of the present invention will be described below. The drawings are to be seen in a direction as indicated by reference numerals. In addition, in a description below, when described as "left," "right," "front," and "rear," they indicate a direction or a position as seen from the driver.

First Embodiment

FIG. 1 is a perspective view of a vehicle body to which a windshield supporting structure according to a first embodiment of the present invention is mounted.

The vehicle body 1 includes left and right front fenders 2, 3, a hood (bonnet) 4 disposed between the left and right front fenders 2, 3, and a windshield supporting structure 10 disposed rearwardly of the hood 4.

Reference numeral 6 denotes a front wheel, and reference numerals 8, 8 denote a windshield wiper.

Figure 2:
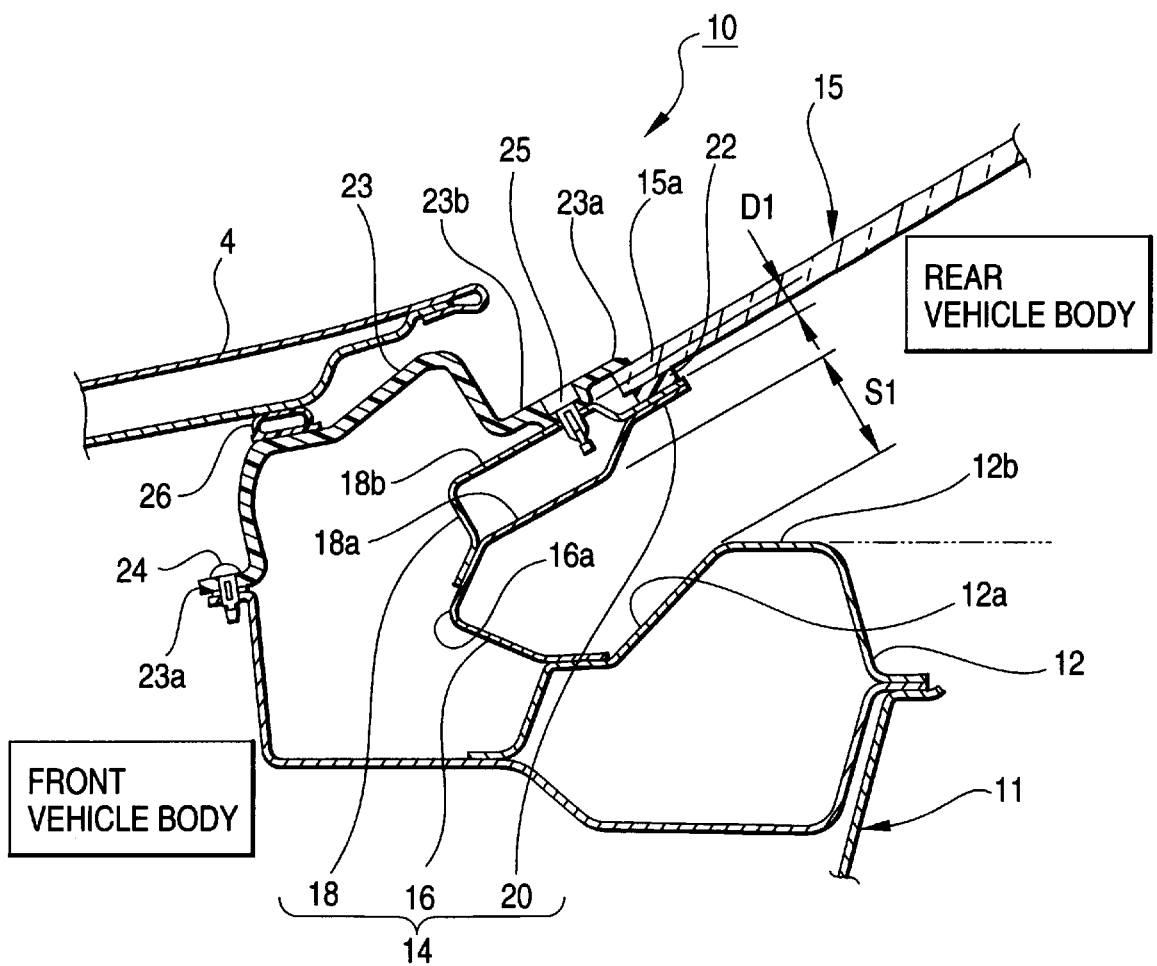
FIG. 2 is a sectional view taken along the plane of line II—II of FIG. 1.

FIG. 2 is a sectional view taken along the plane of line II—II of FIG. 1.

The windshield supporting structure 10 has a construction in which a windshield support 14 is extended from an upper portion 12 (hereinafter, referred to as an "instrument panel upper portion") of an instrument panel 11, so that the windshield support 14 supports a lower edge 15a of a front window glass (windshield), and in which a recessed portion 12 is provided at the instrument panel upper portion 12.

The windshield support 14 is a cross member extending across the vehicle width and formed into a cantilever-like or overhang support member. The windshield support 14 includes a bend portion 16 extended from the instrument panel upper portion 12 and having a substantially V-shaped cross section, a box section 18 having a hollow rectangular cross section and a flange portion 20 for receiving the lower edge 15a of the front window glass 15, which are continuously formed in that order.

The box portion 18 is disposed away from an uppermost portion 12b of the instrument panel upper portion 12 with a gap S1 being provided therebetween.

The front window glass 15 is bonded to the flange portion 20 with an adhesive 22 at the lower edge 15a thereof.

A cowl top 23 is attached to the instrument panel upper portion 12 with a clip 24 at a front end 23a thereof, and is attached to the box portion 18 with a clip 25 at a rear end 23b thereof, whereby a rear edge 23c thereof is constructed to press against the lower edge 15a of the front window glass 15. The cowl top 23 is formed from a synthetic resin. Reference numeral 26 is a seal.

The bend portion 16 is formed in a substantially V-shaped cross section by allowing it to extend upwardly slantways from the recessed portion 12a of the instrument panel upper portion 12 toward the front of the vehicle body and at the same time upwardly slantways from a bending point 16a toward the rear of the vehicle body.

The box portion 18 is formed so as to have a hollow rectangular cross section by mounting a reinforcement member 18b to an upper surface of a lower portion 18a extended from the bendportion 16. Thus, the box portion 18 imparts a required rigidity for supporting the front window glass 15 to the windshield support 14 and is interposed between the bend portion 16 and the flange portion 20 so as to sufficiently separate the flange portion 20 from the bend portion 16.

This box portion 18 is provided so as to allow the lower portion 18a to be received in the recessed portion 12a when the bend portion 16 is bent at the bending point 16a by virtue of a force applied from the front.

In addition, as described above, since the box portion 18 is disposed away from the instrument panel with a gap S1 being provided therebetween, it is possible to dispose the box portion 18 sufficiently away from the instrument panel upper portion 12a.

The flange portion 20 is formed so as to have a difference in level D1 from the reinforcement member 18b of the box portion 18, disposed in parallel with the front window glass 15 and attached to the lower edge 15a of the front window glass 15 with an adhesive 22.

Next, a function of the windshield supporting structure 10 described heretofore will be described below.

Figure 3A:
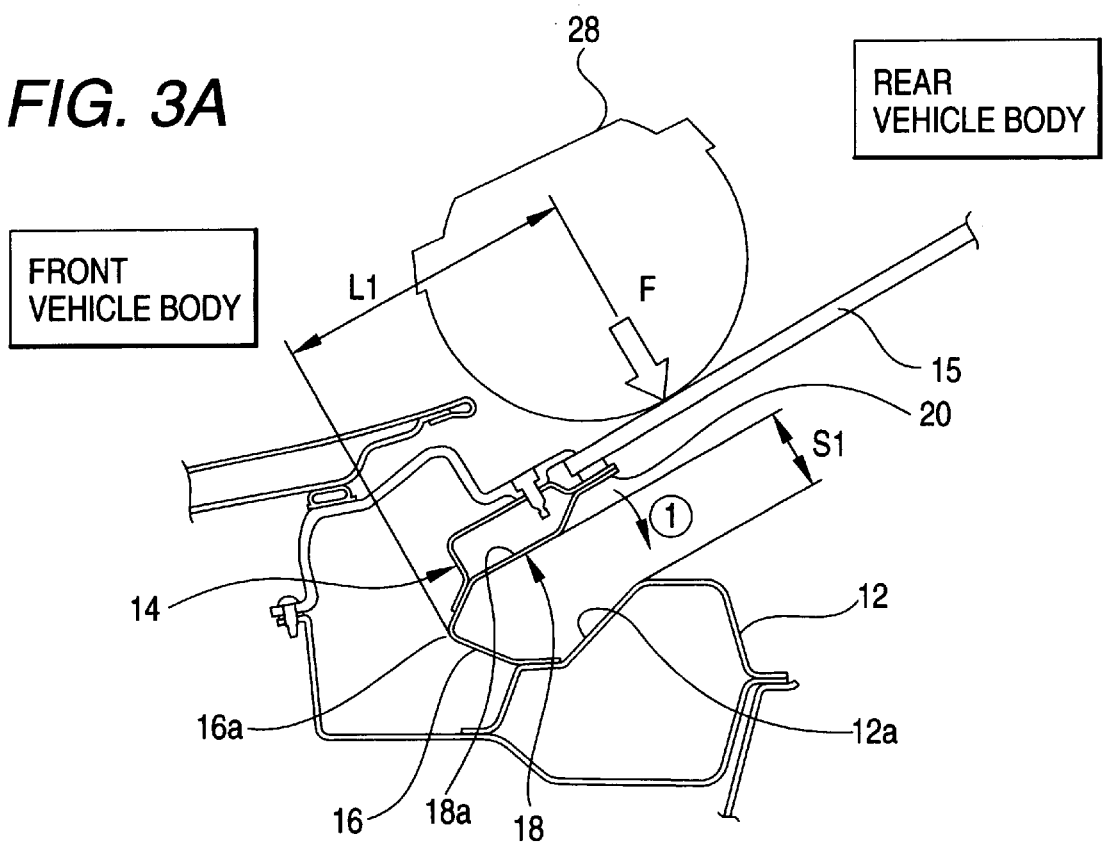
FIGS. 3A and 3B are explanatory views explaining a function of a windshield supporting structure according to the first embodiment of the present invention.
Figure 3B:
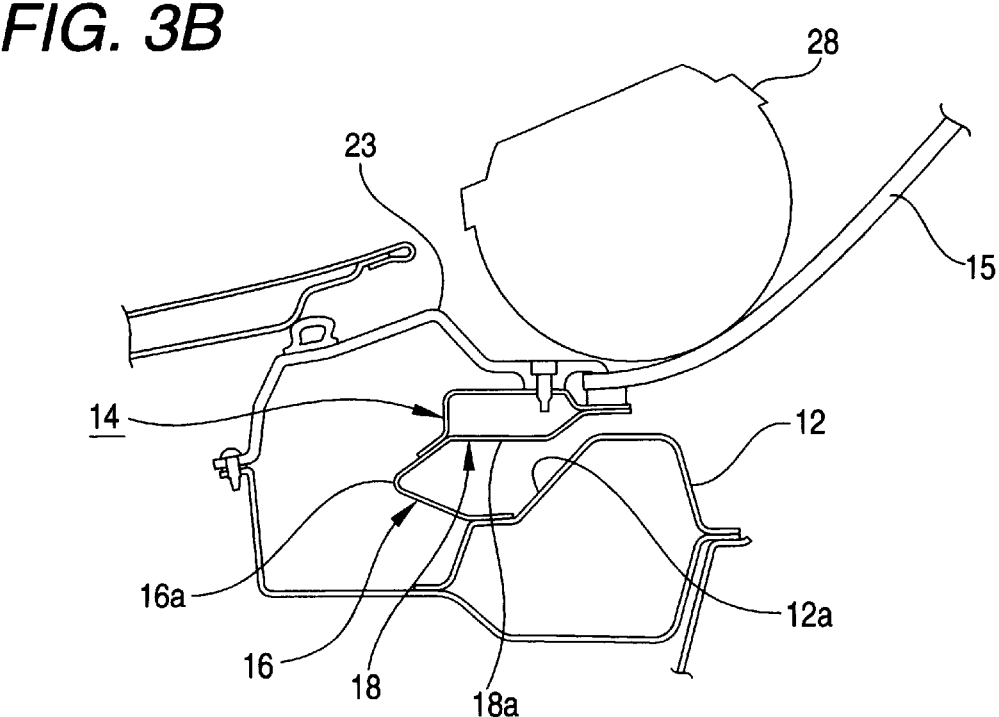

FIGS. 3A and 3B are explanatory views explaining a function of the windshield supporting structure according to the first embodiment of the present invention.

In FIG. 3A, when a dummy (hereinafter, referred to as an "obstacle") 28 comes into collision with the front window glass 15, an external force F is applied to the front window glass 15 from the front top (from the top left-hand side to the bottom right-hand side as viewed in the figure). Since the distance L1 from the point of application of the external force F to the bending point 16a of the bend portion 16 is longer, the windshield support 14 is easily bent as shown by an arrow ① at the bending point 16a acting as a fulcrum.

Since the box portion 18 of the windshield support 14 is disposed away from the uppermost portion 12b of the instrument panel upper portion 12 with the gap S1 provided therebetween and since the recessed portion 12a is provided at the instrument panel upper portion 12 for receiving the lower portion 18a of the box portion 18, it is possible to secure a sufficient deformation area for the windshield support 14.

In FIG. 3B, even if the windshield support 14 is deformed sufficiently, the windshield support 14 does not come into abutment with the instrument panel upper portion 12.

Thus, since not only is it possible to allow the windshield support 14 to be deformed easily but also to secure a sufficient deformation area for the windshield support 14, impact applied to the obstacle 28 can be absorbed in a secure fashion.

Second Embodiment

Next, a second embodiment will be described below. Now, like reference numerals are imparted to like members to those described as to the first embodiment, and a description thereof will be omitted.

Figure 4:
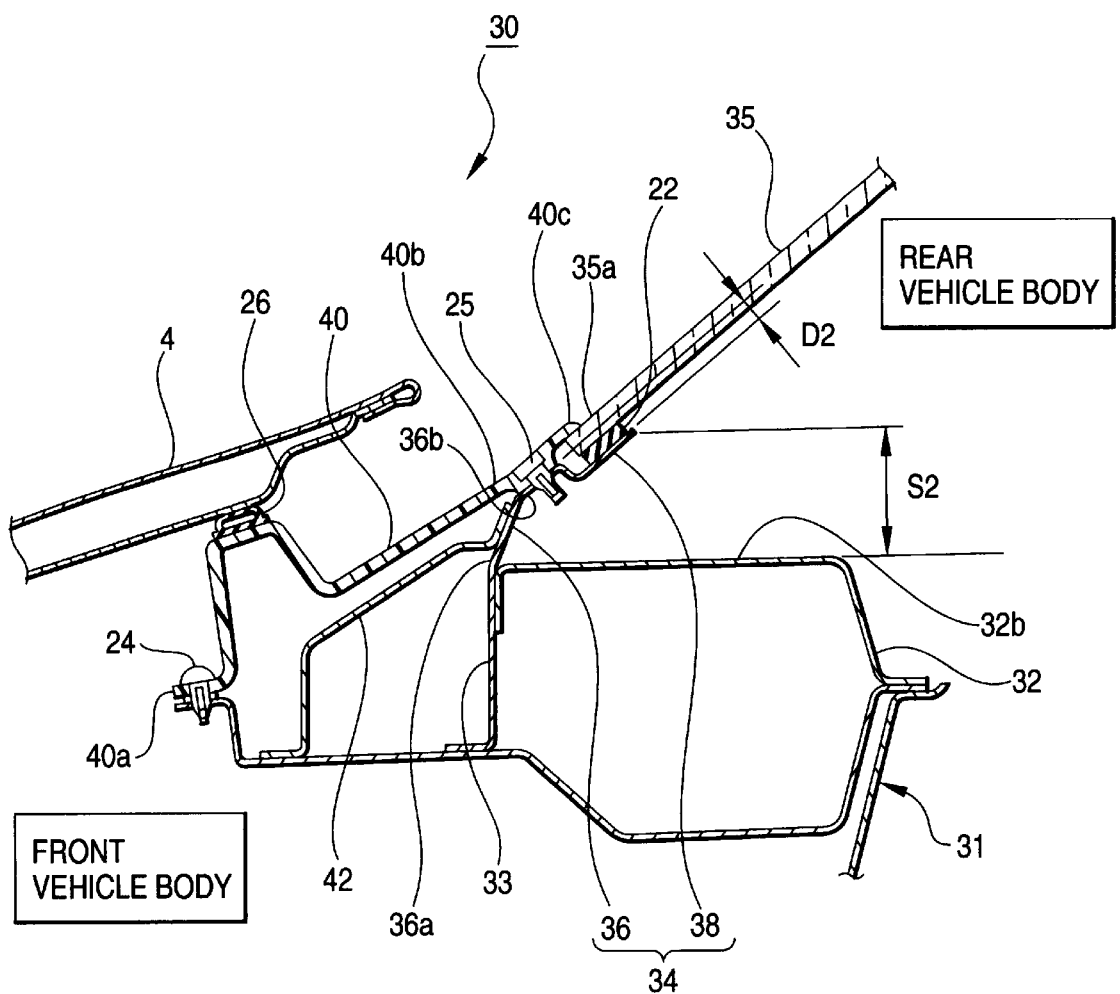
FIG. 4 is a sectional view of the windshield supporting structure according to a second embodiment of the present invention.

FIG. 4 is a sectional view of a windshield supporting structure according to the second embodiment of the present invention.

A windshield supporting structure 30 is constructed such that a windshield support 34 is extended from a front panel 33 constituting an upper portion 32 (hereinafter, referred to as an"instrument panel upper portion") of an instrument panel 31 toward the rear of the vehicle body, so that the windshield support 34 can support a lower edge 35a of a front window glass 35 (windshield).

The windshield support 34 is a cantilever-like or overhang member with an extended portion 36 and a flange portion 38, which are formed continuously in that order. The extended portion 36 is extended upwardly slantways from the front panel 33 toward the front window glass 35. The flange portion 38 is constructed so as to receive the lower edge 35a of the front window glass 35. The flange portion 38 is disposed away from an uppermost portion 32b of the instrument panel upper portion 32 with a gap S2 being provided therebetween.

The front window glass 35 is bonded to the flange portion 38 with an adhesive 22 at the lower edge 35a.

A cowl top 40 is attached to the instrument panel upper portion 32 with a clip 24 at a front end 40a thereof and to the extended portion 36 with a clip 25 at a rear end 40b thereof. Thus, a rear edge 40c of the cowl top 40 presses against the lower edge 35a of the front window glass 35. The cowl top 40 is formed from a synthetic resin.

The extended portion 36 is slightly bent toward the rear of the vehicle body at a bending point 36a in a lower end thereof and bent in parallel with the front window glass 35 at a center 36b.

The flange portion 38 is formed so as to produce a difference in level D2 from the extended portion 36, extended in parallel with the front window glass 35 and attached to the lower edge 35a of the front window glass 35 with the adhesive 22.

The flange portion 38 is provided at a distal end of the extended portion 36, and the front window glass 35 is disposed at this flange portion 38. Owing to this, it is possible to set a longer distance between a point of application of an external force and the extended portion 36, and therefore, the windshield support 34 is allowed to be easily bent at the bending point 36a of the extended portion 36.

In addition, as described above, since the flange portion 38 is disposed away from the uppermost portion 32b of the instrument panel upper portion 32 with the gap S2, it is possible to dispose the flange portion 38 sufficiently away from the instrument panel upper portion 32.

A cowl top panel 42 is disposed downwardly of the cowl top 40, and attached to the instrument panel upper portion 32 at a lower end thereof and to the extended portion 36 at an upper end thereof. A wiper pitholder is mounted on the cowl top panel 42 to support a wiper shaft (not shown).

Next, a function of the windshield supporting structure 30 described above will be described below.

Figure 5A:
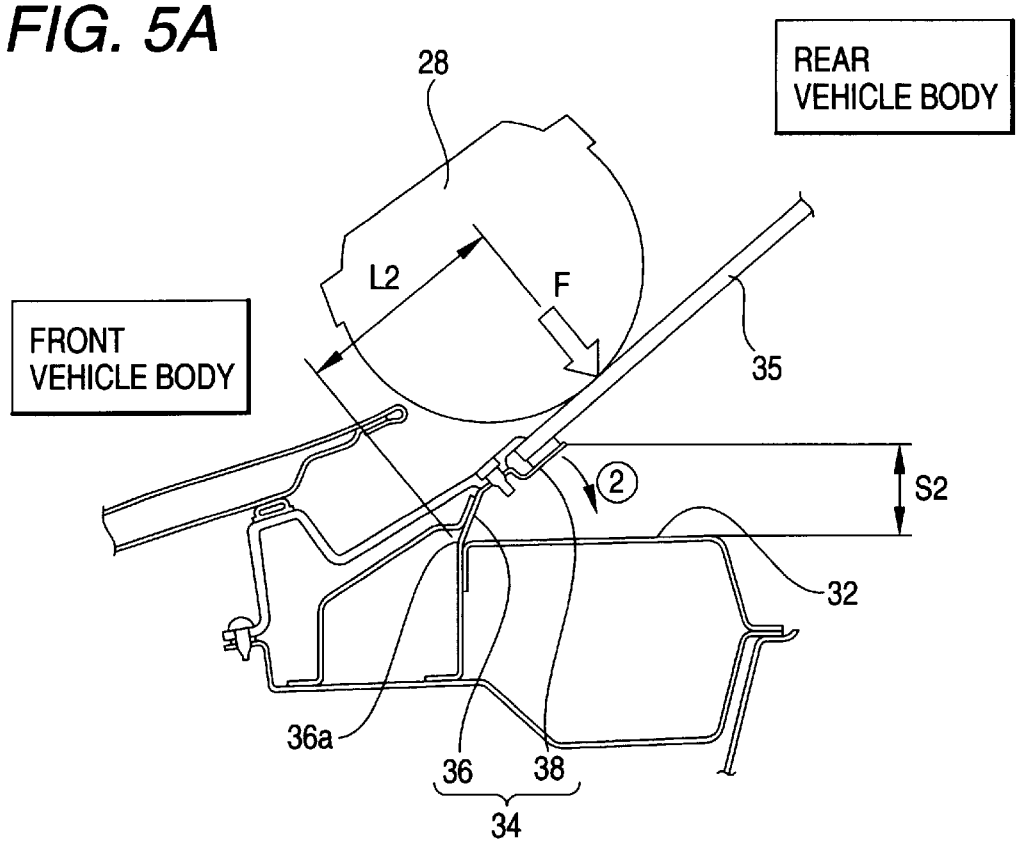
FIGS. 5A and 5B are explanatory views explaining a function of a windshield supporting structure according to the second embodiment of the present invention.
Figure 5B:
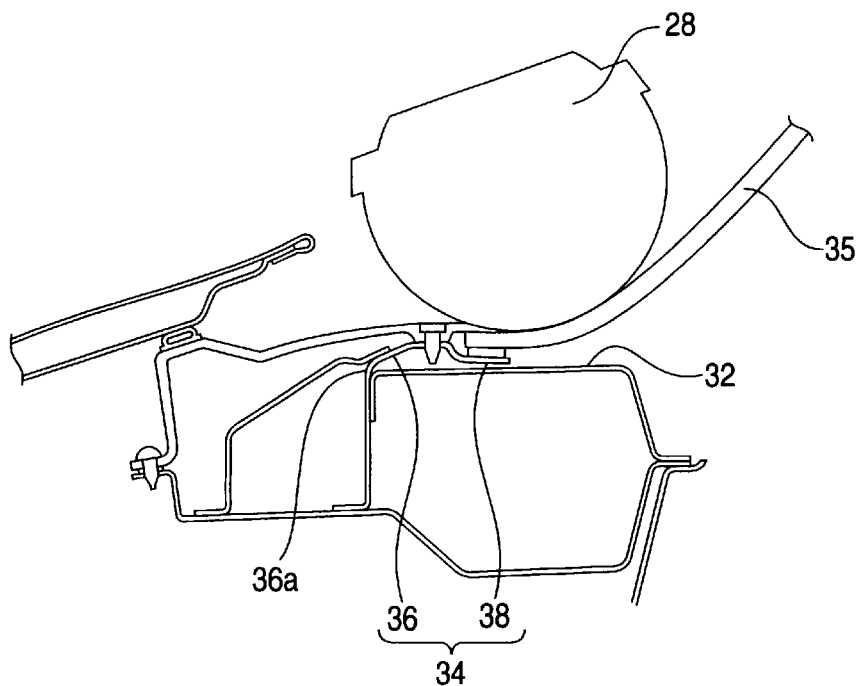
Figure 6:
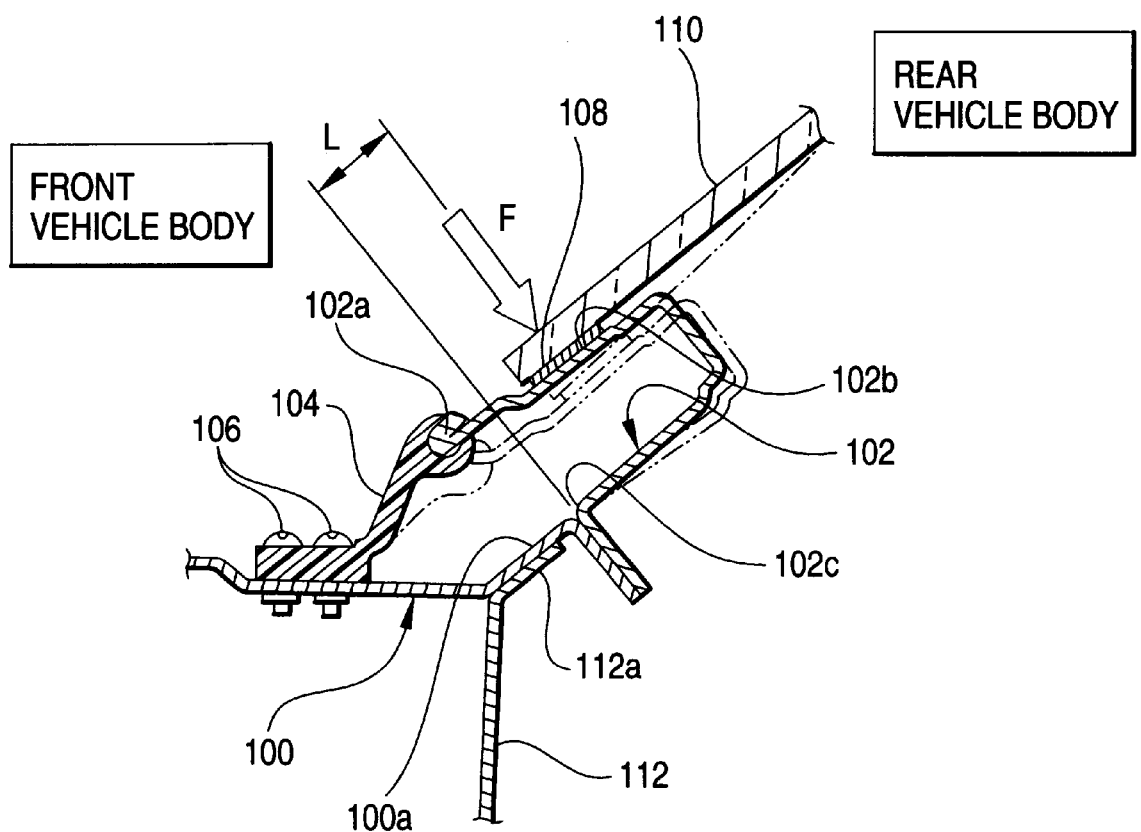
FIG. 6 is a sectional view of a related windshield supporting structure.

FIGS. 5A and 5B are explanatory views explaining a function of the windshield supporting structure according to the second embodiment of the present invention.

In FIG. 5A, when the obstacle 28 comes into collision with the front window glass 35, an external force F is applied to the front window glass 35 from the front top (from the top left-hand side to the bottom right-hand side as viewed in the figure). Since the distance L2 from the point of application of the external force F to the bending point 36a of the bend portion 36 is longer, the windshield support 34 is allowed to be easily bent, as shown by an arrow ②, at the bending point 36a as a fulcrum.

Since the flange portion 38 of the windshield support 34 is disposed away from the uppermost portion 32b of the instrument panel upper portion 32 with the gap S2 being provided therebetween, it is possible to secure a sufficient deformation area for the windshield support 34.

In FIG. 5B, even if the windshield support 34 is deformed sufficiently, the windshield support 34 does not come into abutment with the instrument panel upper portion 32.

Since the windshield support 34 can easily be deformed with the sufficient deformation area therefor being secured, it is possible to absorb impact applied to the obstacle 28 in a secure fashion.

Described in the above embodiments are the examples in which the windshield supporting structures according to the present invention are applied to the front window or windshield side, but in addition thereto, it is also possible to apply them to the rear window.

In the first embodiment, although the box portion 18 is formed so as to have a hollow rectangular cross section, it is not limited to the rectangular cross section, and, for instance, a triangular cross section may be used.

In the above embodiments, although the descriptions are made where glass 15, 35 is used as the windshield, any other suitable material other than glass may be used.

With the aforementioned constructions, the present invention provides the following effectiveness.

According to the first aspect of the invention, since the windshield support is formed as the cantilever-like or overhang support and furthermore since the box portion is interposed between the bend portion and the flange portion, the flange portion can sufficiently be separated from the bend portion. This allows a longer distance to be set between the point of application of force acting on the windshield and the bend portion, and therefore, the windshield support can easily be bent at the bend portion.

In addition, since the box portion of the windshield support is disposed sufficiently away from the instrument panel upper portion, and furthermore since the recessed portion is provided at the instrument panel upper portion for receiving the box portion, it is possible to secure a sufficient deformation area for the windshield support.

As a result of this, should there be encountered an accident, since impact applied to an obstacle can be absorbed in an ensured fashion, it is possible to secure the safety of a pedestrian.

According to the second aspect of the invention, the windshield support is formed as a cantilever-like or overhang support, the flange portion is provided at a distal end of the extended portion, and the windshield is disposed at this flange portion. Owing to this, it is possible to set a longer distance between the point of application of a force acting on the windshield and the extended portion, the windshield support can easily be bent at the extended portion.

Furthermore, since the flange portion of the windshield support is sufficiently separated from the instrument panel upper portion, it is possible to secure a sufficient deformation area for the windshield support.

As a result of this, should there be encountered an accident, impact applied to an obstacle can absorbed in an ensured fashion, and therefore the safety can be secured.

The present disclosure relates to the subject matter contained in Japanese patent application No. Hei 10-129307 filed on May 12, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. A windshield supporting structure that supports a windshield, comprising:
    a substantially U-shaped instrument panel upper portion having a recessed portion; and
    a windshield support extending from said instrument panel upper portion to support a lower edge of the windshield, said windshield support including:
        a box portion and a bend portion, said bend portion having a substantially V-shaped cross-section with a first end and a second end, said first end of said bend portion extending from said recessed portion of said instrument panel upper portion;
        said box portion having a lower portion abutting said second end of said bend portion and a reinforcement member to form a hollow rectangular cross-section, said box portion being disposed away from said upper portion of said instrument panel; and
        a flange portion extending from a top portion of said box portion to receive the windshield,
    wherein said recessed portion receives said lower portion of said box portion when said bend portion is bent by a force applied to the windshield.

2. A windshield supporting structure according to claim 1, wherein said box portion is disposed away from said instrument panel upper portion so that said box portion does not come into abutment with an instrument panel when the force is applied to the windshield.

3. A windshield supporting structure according to claim 1, wherein said box portion is disposed to extend rearward from said second end portion of said bend portion.

* * * * *